United States Patent
Wett et al.

(10) Patent No.: US 9,670,083 B2
(45) Date of Patent: Jun. 6, 2017

(54) METHOD AND APPARATUS FOR WASTEWATER TREATMENT USING EXTERNAL SELECTION

(71) Applicants: Hampton Roads Sanitation District, Virginia Beach, VA (US); D.C. Water & Sewer Authority, Washington, DC (US)

(72) Inventors: Bernhard Wett, Innsbruck (AT); Charles Bott, Virginia Beach, VA (US); Sudhir Murthy, Washington, DC (US); Haydee De Clippeleir, Washington, DC (US)

( * ) Notice: Subject to any disclaimer, the term of this patent is extended or adjusted under 35 U.S.C. 154(b) by 66 days.

(21) Appl. No.: 14/788,039

(22) Filed: Jun. 30, 2015

(65) Prior Publication Data

US 2015/0376043 A1 Dec. 31, 2015

Related U.S. Application Data

(60) Provisional application No. 62/019,210, filed on Jun. 30, 2014.

(51) Int. Cl.
*C02F 3/28* (2006.01)
*C02F 3/30* (2006.01)
(Continued)

(52) U.S. Cl.
CPC .............. *C02F 3/28* (2013.01); *C02F 3/2866* (2013.01); *C02F 3/308* (2013.01); *C02F 11/127* (2013.01);
(Continued)

(58) Field of Classification Search
CPC .... C02F 3/28; C02F 3/2866; C02F 2101/105; C02F 2203/004; C02F 2203/006;
(Continued)

(56) References Cited

U.S. PATENT DOCUMENTS

| 4,056,465 A | 11/1977 | Spector |
| 5,582,733 A | 12/1996 | Desbos et al. |

(Continued)

FOREIGN PATENT DOCUMENTS

| DE | 3628203 | 2/1988 |
| DE | 4016457 | 2/1992 |

(Continued)

OTHER PUBLICATIONS

Chudoba et al."Control of Activated Sludge Filamentous Bulking II. Selection of Microorganisms by Means of a Selector," Water Res., 7, 1389, 1973.

(Continued)

*Primary Examiner* — Fred Prince
(74) *Attorney, Agent, or Firm* — McGuireWoods LLP

(57) ABSTRACT

A method and an apparatus for biological wastewater treatment that includes a biological selector and a physical selector. The apparatus comprises an internal biological reactor where wastewater and recycled biomass are combined to provide a high substrate and high electron acceptor gradient for generating morphological biomass features that favor granule formation over floc and filament formation, and an external gravimetric or external screen selector operating on the biomass waste stream for collecting and retaining densified biomass aggregates including dense granule selection and for wasting lighter filaments and flocs. In the method and apparatus, particles may be added to provide cores to promote the formation of aggregates encapsulating the seeded particles. The particles may be added as various materials, for example, in the bioreactor, to initiate or seed the formation of a granule, that could then be separated by or integrated with either the external gravimetric or external screen selector. Further, organisms may be selected for biological phosphorus removal, denitrifying (Continued)

methane oxidizers, biological sulfur or sulfide oxidation, methanogenesis.

47 Claims, 9 Drawing Sheets

(51) Int. Cl.
| | |
|---|---|
| C02F 11/12 | (2006.01) |
| C02F 3/12 | (2006.01) |
| C02F 3/22 | (2006.01) |
| C02F 101/10 | (2006.01) |

(52) U.S. Cl.
CPC .......... C02F 3/1268 (2013.01); C02F 3/223 (2013.01); C02F 2101/105 (2013.01); C02F 2203/004 (2013.01); C02F 2203/006 (2013.01); C02F 2209/001 (2013.01); C02F 2209/14 (2013.01); C02F 2209/15 (2013.01); C02F 2209/22 (2013.01); C02F 2303/16 (2013.01); C02F 2303/24 (2013.01); C02F 2305/06 (2013.01); Y02E 50/343 (2013.01); Y02W 10/15 (2015.05)

(58) Field of Classification Search
CPC ........ C02F 3/1268; C02F 3/223; C02F 3/308; C02F 11/127; C02F 2209/001; C02F 2209/14; C02F 2209/15; C02F 2209/22; C02F 2303/16; C02F 2303/24; C02F 2305/06; Y02E 50/243; Y02W 10/15
USPC ....... 210/605, 614, 615, 616, 617, 623, 631, 210/252, 259, 150, 151, 906
See application file for complete search history.

(56) References Cited

U.S. PATENT DOCUMENTS

| | | |
|---|---|---|
| 5,863,435 A | 1/1999 | Heijnen et al. |
| 6,183,642 B1 | 2/2001 | Heijnen et al. |
| 6,383,390 B1 | 5/2002 | Van Loosdrecht et al. |
| 6,406,617 B1 | 6/2002 | Brauchli |
| 6,566,119 B1 | 5/2003 | Heijnen et al. |
| 6,605,220 B2 | 8/2003 | Garcia et al. |
| 6,645,386 B1 | 11/2003 | Moreau et al. |
| 7,060,185 B2 | 6/2006 | Kim et al. |
| 7,273,553 B2 | 9/2007 | Van Loosdrecht et al. |
| 7,569,147 B2 | 8/2009 | Curtis et al. |
| 7,846,334 B2 | 12/2010 | Wett |
| 8,157,988 B2 | 4/2012 | Quevillon |
| 8,268,169 B2 | 9/2012 | Lean et al. |
| 8,911,628 B2 | 12/2014 | Nyhuis |
| 2005/0087480 A1 | 4/2005 | Park et al. |
| 2007/0000836 A1 | 1/2007 | Elefritz et al. |
| 2008/0223789 A1 | 9/2008 | Hasan et al. |
| 2009/0221054 A1 | 9/2009 | Wett |
| 2009/0221854 A1 | 9/2009 | Oevering et al. |
| 2009/0272690 A1 | 11/2009 | Wett |
| 2009/0282882 A1 | 11/2009 | Verhave et al. |
| 2010/0170845 A1 | 7/2010 | Baur |
| 2010/0288693 A1 | 11/2010 | Vion et al. |
| 2011/0198284 A1 | 8/2011 | Nyhuis |
| 2012/0048802 A1 | 3/2012 | Brown et al. |
| 2013/0134089 A1* | 5/2013 | Cote .......... C02F 3/30 210/605 |
| 2013/0196403 A1* | 8/2013 | Bowers .......... C02F 1/5254 435/168 |
| 2014/0144836 A1 | 5/2014 | Nyhuis et al. |
| 2014/0178281 A1* | 6/2014 | Bowers .......... C02F 1/5254 423/306 |
| 2014/0305867 A1 | 10/2014 | Nyhuis |

FOREIGN PATENT DOCUMENTS

| | | |
|---|---|---|
| DE | 19855794 | 6/2000 |
| DE | 10 2005 045 170 | 3/2007 |
| EP | 0872451 | 12/2012 |
| JP | 2001-096297 | 4/2001 |
| WO | WO 2014/085662 A1 * | 4/2015 |

OTHER PUBLICATIONS

Gabb et al."The Selector Effect on Filamentous Bulking in Long Sludge Age Activated Sludge Systems," Water Sci. Technol., 23(2-6), 867, 1991.

Jenkins et al."Manual on the Causes and Control of Activated Sludge Bulking, Foaming, and Other Solids Separation Problems," 3rd edition, Lewis Publishers, USA, 2004.

Marshall et al."Selectors in Pulp and Paper Mill-activated Sludge Operations: Do they work?" Pulp and Paper Canada, 101(3), 48-53, 2000.

Lebek et al."Control of the Growth of Microthrix parvicella by Using an Aerobic Selector—Results of Pilot and Full Scale Plant Operation," Water Sci. Technol., 46(1-2), 2002.

Marten et al."Full-scale evaluation of factors affecting the performance of anoxic selectors," Water Environ. Res., 69 (7), 1272-1289, 1997.

Parket et al."Discussion of: Full-scale evaluation of factors affecting the performance of anoxic selectors," Water Environ. Res., 70 (6), 1225-1228, 1998.

Schuler et al.,"Microbial storage products, biomass density, and settling properties of enhanced biological phosphorus removal activated sludge," Water Sci. Technol., 4, 2001.

Davoli et al."Testing the effect of selectors in the control of bulking and foaming in small activated sludge plants," Water Sci Technol. 46(1-2):495-8, 2002.

Parket et al."Making classifying selectors work for foam elimination in the activated sludge process," Water Environ. Res., 75 (1), 83-91, 2003.

Morgenroth et al. "Aerobic Granular Sludge in a Sequencing Batch Reactor," Water Research, vol. 31 No. 12 pp. 3191-3194, 1997.

Dangeong Peng et al. "Aerobic Granular Sludge," A Case Report Water Research, vol. 33 No. 3 pp. 890-893, 1999.

Abeling et al. "Anaerobic-Aerobic Treatment of High Strength Ammonium Wastewater—Nitrogen Removal via Nitrite," Wat. Sci. Tech. vol. 26, No. 5-6, pp. 1007-1015, 1992.

Alleman et al. "Storage-Induced Denitrification Using Sequencing Batch Reactor Operation," Water Research vol. 14. pp. 1483-1488, 1980.

Anthonisen et al. "Inhibition of Nitrification by Ammonia and Nitrous Acid," Water Pollution Control Federation vol. 28, No. 5, pp. 835-852, 1976.

Daebel et al. "Exploring Temporal Variations of Oxygen Saturation Constants of Nitrifying Bacteria," Water Research 41, pp. 1094-1102, 2007.

Guo et al. "Effective and Robust Partial Nitrification to Nitrite by Real-time Aeration Duration Control in an SBR Treating Domestic Wastewater," Process Biochemistry 44, 2009.

Hanaki et al. "Nitrification at Low Levels of Dissolved Oxygen With and Without Organix Loading in a Suspended-Growth Reactor," Wat. Res. vol. 24, No. 3, pp. 297-302, 1990.

Hellinga et al. "The Sharon Process: An Innovative Method for Nitrogen Removal From Ammonium-Rich Waste Water," Water Science and Technology vol. 37 Issue 9, pp. 135-142, 1998.

Hippen et al. "Aerobic Deamoonification: A New Experience in the Treatment of Wastewaters," Wat. Sci. Tech. vol. 35, No. 10, pp. 111-120, 1997.

Ju et al. "Simultaneous Nitrification, Denitrification, and Phosphorous Removal in Single-Tank Low-Dissolved-Oxygen Systems Under Cyclic Aeration," Water Env. Res., 2007.

Kim et al. "Comparison Study of the Effects of Temperature and Free Ammonia Concentration on Nitrification and Nitrite Accumulation," Process Biochemistry 43, 154-160, 2008.

(56) References Cited

OTHER PUBLICATIONS

Kornaros et al. "Partial Nitrification/Denitrification Can be Attributed to the Slow Response of Nitrite Oxidizing Bacteria to Periodic Anoxic Disturbances," Env. Sci., 2008.
Laanbroek et al. "Competition for Limiting Amounts of Oxygen between Nitrosomonas Europaea and Nitrobacter Winogradskyi Grown in Mixed Continuous Cultures," Arch Micro, 1993.
Li et al. "Partial Nitritation of Landfill Leachate with Varying Influent Composition under Intermittent Aeration Conditions," Process Safety and Env. Prot. V 91 Issue 4, 2013.
Ling, "Experience from Commissioning of Full-scale DeAmmon plant at Himmerfjarden," Proceedings of 2nd IWA Specialized Conference, Lemtech Konsulting, ed., pp. 403-410.
Peng et al. "Nitrite Accumulation by Aeration Controlled in Sequencing Batch Reactors Treating Domestic Wastewater," Water Sci. Tech. vol. 50 No. 10 pp. 35-43, 2004.
Peng et al. "Partial Nitrification from Domestic Wastewater by Aeration Control at Ambient Temperature," Chin. J. Chem. Eng., 15(1) 115-121, 2007.
Silverstein et al. "Performance of SBR Activated Sludge Processes with Nitrification/Denitrification," Water Pollution Control Fed., vol. 55, No. 4 pp. 377-384, 1983.
Turk et al. "Preliminary Assessment of a Shortcut in Nitrogen Removal from Wastewater," Canadian Journal of Civil Engineering, vol. 13, Issue 6, 1986.
Turk et al. "Maintaining Nitrite Build-Up in a System Acclimated to Free Ammonia," Wat. Res. vol. 23, No. 11, pp. 1383-1388, 1989.
Wong-Chong et al. "Kinetics of Microbial Nitrification: Nitrite-Nitrogen Oxidation," Wat. Res. vol. 12. pp. 605-609, 1978.
Yang et al. "Nitrogen Removal via Short-Cut Simulataneous Nitrification and Denitrification in an Intermittently Aerated Moving Bed Membrane Bioreactor," Haz. Mat. 195, 2011.
Yoo et al. "Nitrogen Removal From Synthetic Wastewater by Simultaneous Nitrification and Denitrification and Denitrification via Nitrite in an Intermittently-Aerated Reactor."
Zeng et al. "Control and Optimization of Nitrifying Communities for Nitritation from Domestic Wastewater at Room Temperature," Enzyme and Microb. Tech. 45, pp. 226-232, 2009.
Gao, et al. "Shortcut nitrification-denitrification by real-time control strategies," Bioresource Technology; journal homepage: www.elsevier.com/locate/biortech; p. 2298-2300.
C.S.Gee, et al. "Nitrite accumulation followed by denitrification using sequencing batch reactor," Water Science and Technology vol. 49 No. 5-6 pp. 47-55.
A.N. Katsogiannis, et al. "Enhanced nitrogen removal in SBRs bypassing nitrate generation accomplished by multiple aerobic/anoxic phase pairs" Water Science and Tech. vol. 47.

Romain Lemaire, et al. "Achieving the Nitrite Pathway Using Aeration Phase Length Control and Step-Feed in an SBR Removing Nutrients from Abattoir Wastewater" Biotechnology.
Manser, et al. "Consequences of mass transfer effects on the kinetics of nitrifiers" Water Research 39 (2005) pp. 4633-4642.
Pollice, et al. "Influence of aeration and sludge retention time on ammonium oxidation to nitrite and nitrate" Water Research 36 (2002) pp. 2541-2546.
Sin, et al. "Modelling nitrite in wastewater treatment systems: a discussion of different modelling concepts" Water Science & Technology 58.6 2008 p. 1155-1171.
Sliekers, et al. "Competition and coexistence of aerobic ammonium- and nitrite-oxidizing bacteria at low oxygen concentrations" Environmental Biotechnology Apr. 8, 2005 p. 808-817.
Van Dongen, et al. "The SHARON-Anammox Process for treatment of ammonium rich wastewater" Water Science and Technology vol. 44 No. 1 p. 153-160.
Wett "Solved upscaling problems for implementing deammonification of rejection water" Water Science & Technology vol. 53 No. 12 p. 121-128.
Wett, et al. "Syntrophy of Aerobic and Anaerobic Ammonia Oxidisers" Water Science & Technology—WST 61.8 2010 pp. 1915-1922.
Wyffels, et al. "Nitrogen removal from sludge reject water by a two-stage oxygen-limited autotrophic nitrification denitrification process" Water Science and Technology vol. 49.
Yu, et al. "Performance Enhancement of SBR Applying Real-Time Control" Journal of Environmental Engineering; Oct. 2000 pp. 943-948.
Zekker, et al. "Achieving nitritation and anammox enrichment in a single moving-bed biofilm reactor treating reject water" Environmental Technology, 33:6, 703-710.
Zeng, et al. "Process Control of an Alternating Aerobic-Anoxic Sequencing BAtch Reactor for Nitrogen Removal via Nitrite" Chem. Eng. Technol. 2008, 31, No. 4, 582-587.
Bernet, et al. "Nitrification at Low Oxygen Concentration in Biofilm Reactor" Journal of Environmental Engineering Mar. 2001 pp. 266-271.
Blackburne, et al "Partial nitrification to nitrite using low dissolved oxygen concentration as the main factor" Springer Science+Business Media B.V. 2007.
Ciudad, et al. "Partial nitrification of high ammonia concentration wastewater as a part of a shortcut biological nitrogen removal process" Process Biochemistry 40 (2005) 1715.
Fux, et al. "Biological treatment of ammonium-rich wastewater by partial nitritation and subsequent anaerobic ammonium oxidation (anammox) in a pilot plant" Journal of Biotec.
Wett, "Development and implementation of a robust deammonification process," Water Science & Technology, vol. 56, No. 7, pp. 81-88.

* cited by examiner

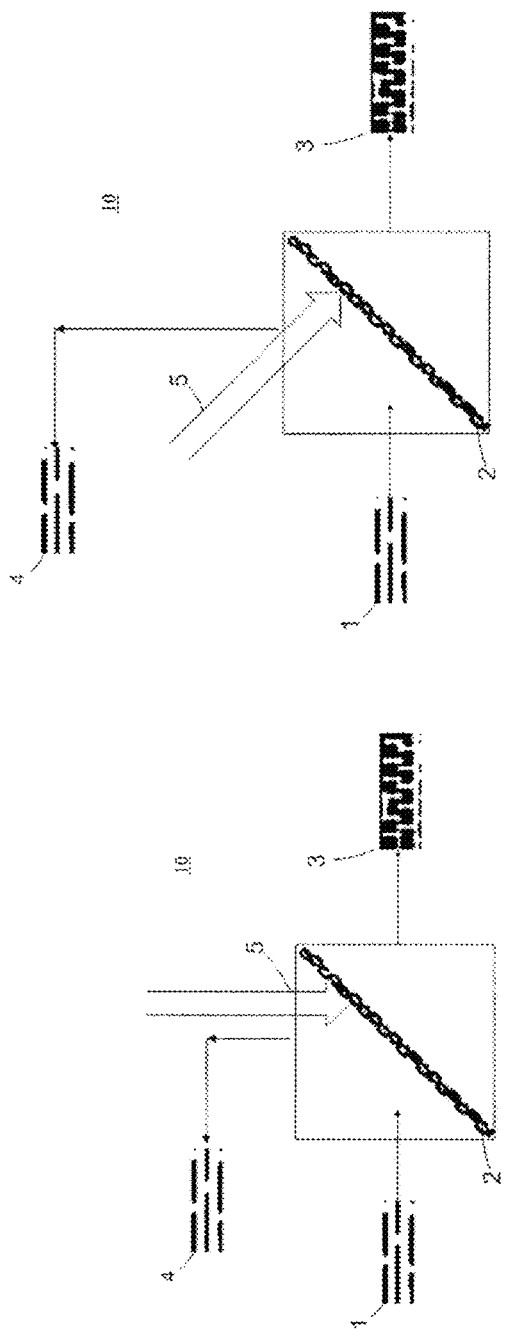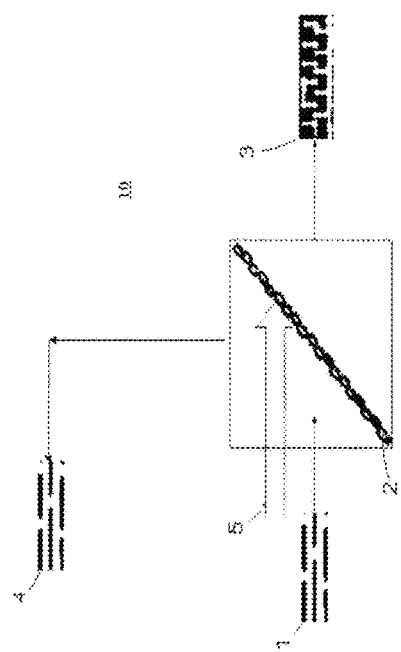

METHOD AND APPARATUS FOR WASTEWATER TREATMENT USING EXTERNAL SELECTION

CROSS REFERENCE TO PRIOR APPLICATION

This application claims priority to and the benefit thereof from U.S. Provisional Patent Application No. 62/019,210, filed Jun. 30, 2014, titled "Method and Apparatus for Wastewater Treatment Using External Gravimetric Selection," the entirety of which is incorporated herein by reference and thereby fully set forth herein.

FIELD OF THE DISCLOSURE

The present disclosure relates generally to a method and an apparatus for wastewater treatment and, more specifically, to a method and an apparatus for wastewater treatment with size or gravimetric selection.

BACKGROUND OF THE DISCLOSURE

Aerobic Granular Sludge Processes

Granular biomass processes for wastewater treatment, were originally limited to anaerobic treatment such as the upflow anaerobic sludge blanket process (UASB), which relies on granular biomass established with a specialty-built upflow reactor to allow symbiotic growth of several different classes of microorganisms, including fermentative, acidogenic, acetogenic, and methogenic. Additional development led to aerobic granular sludge processes being reported in the literature as early as 1997 (Morgenroth E, Sherden T, van Loosdrecht M C M, Heijnen J J, Wilderer P A. Aerobic granular sludge in a sequencing batch reactor. Water Res 1997; 31:3191-4). These processes are characterized by biomass with a higher density and particle size than flocculent biomass, and to date, have all been accomplished in specialty built reactors, primarily associated with sequencing batch reactors and upflow column reactors or reactors providing high shear conditions. The granular biomass has a particle size ranging from about 0.1-5 mm and a sludge volume index ($SVI_{30\ min}$) less than 35-50 mL/g and a $SVI_{5\ min}$ that is similar to the $SVI_{30\ min}$. Similarly, aerobic granules have a settling velocity >10 m/h as opposed to approximately 1 m/h for flocculent biomass. The improved settleability of granular sludge over flocculent biomass is one of the important benefits of the method and apparatus according to the instant disclosure.

One key advantage of aerobic granular sludge is that it can create a niche condition within a granule for any condition that may be needed in separated physical tank volumes. Flocs and conventional activated sludges are subject to diffusion resistance (Shaw et al.), and aerobic granular sludge can take advantage of relative diffusion resistance inside and outside of a granule to develop and grow different populations simultaneously rather than to promote those conditions within physical tank configurations. A claimed benefit of aerobic granular sludge is that the size of the granule results in substrate and electron acceptor gradients within the granule allowing the accumulation of polyphosphorous accumulating organisms (PAO), glycogen accumulating organisms (GAO), anaerobic ammonia oxidizing bacteria (anammox), and denitrifying heterotrophic bacteria near the center of the granule, while aerobic organisms accumulate near the outside of the granule, including nitrifying bacteria and aerobic heterotrophs.

An example of this approach is further explained below for phosphorus removal.

Phosphorous Removal

Phosphorus removal from wastewater is typically achieved through either chemical precipitation using iron or aluminum salts or through the application of an anaerobic selector to allow the accumulation of polyphosphate accumulating organisms which provide biological phosphorus removal. Both of these approaches have disadvantages compared to the processes and systems disclosed herein, whereby stable and reliable phosphorus and nitrogen removal can be achieved without the need for a formal anaerobic selector and without chemical precipitation.

Chemical Phosphorus Removal

Chemicals used for the removal of phosphorus through the formation of precipitates typically include the sulfate or chloride salts of aluminum, ferric iron, and ferrous iron. These chemicals can be added ahead of primary clarification, into the biological process itself (typically activated sludge), or into the primary clarification process, ahead of a tertiary clarification or filtration process. The precipitated phosphorus is then removed from the wastewater flow with the solids stream leaving the primary clarifier, with the waste biomass, with tertiary clarifier solids, or with filter backwash waste, respectively. Problems with this approach include the need to purchase chemicals, the consumption of alkalinity as a result of adding these chemicals potentially requiring the addition of alkalinity and purchase or more chemical, the generation of additional sludge requiring further treatment and disposal.

Biological Phosphorus Removal

Biological phosphorus removal (bioP) is well known in the field of wastewater treatment and has the advantages over chemical phosphorus removal of decreased chemical costs, alkalinity demand, and sludge production but suffers from the need for a defined and formal anaerobic zone or period without contamination of dissolved oxygen or oxidized forms of nitrogen (nitrite and nitrate), proper wastewater characteristics in terms of volatile fatty acid (VFA) concentration, and often poor process reliability and upsets. BioP is generally accomplished by the accumulation of phosphate accumulating organisms (PAOs), which store phosphorus as polyphosphate (poly-P) as a source of energy. Under anaerobic conditions, PAOs cleave phosphate groups from poly-P, releasing phosphate to the bulk liquid, and from this obtain energy required to take up VFA. The VFA is stored as an intracellular macromolecule such as polyhydroxybutyrate (PHB). Reducing equivalents are also obtained by PAOs from the degradation of glycogen under anaerobic conditions. Under aerobic conditions, PAO take up phosphate to reform the intracellular poly-P pool and degrade the stored PHB for growth and energy through normal catabolic and anabolic pathways. Glycogen is also reformed under aerobic conditions. The process of bioP is therefore accomplished by subjecting typically flocculent biomass to alternative anaerobic and aerobic conditions according to the schematic shown in FIG. 1, which represents a process known commonly as A2/O or Phoredox and which is capable of both bioP, nitrification, and denitrification. A requirement for this process is a formal anaerobic selector zone with adequate degradable organic material in the form of acetate, or more generally VFA.

With a proper ratio of VFA to phosphorus, PAOs are able to take up all of the phosphate released in the anaerobic zone and additional phosphate present in the wastewater, achieving a net removal of phosphate through biomass wasting. One challenge associated with the A2/O process as shown in FIG. 1 is that nitrate present in the return activated sludge (RAS) stream can enter the anaerobic zone, and this is well known to disrupt the bioP process. Another aspect of relevance to this disclosure is the ability of some PAO to denitrify (dPAO), whereby nitrate can serve as the electron acceptor instead of oxygen, allowing phosphorus uptake in the anoxic zone. While phosphate uptake by dPAO is known to be significantly slower than under aerobic conditions, the important benefit of maximizing this metabolism is efficiency of use of the same pool of organic carbon in the incoming wastewater for both bioP and nitrogen removal. Limitations of the bioP process include poor reliability in terms of consistent compliance with low effluent total phosphorus limits and strict reliance on the availability of an appropriate quantity of VFA in the incoming wastewater.

Reactor Configurations for Aerobic Granular Biomass

One such reactor is disclosed in U.S. Pat. No. 5,985,150, which appears to be assigned to Biothane Systems International B.V. In this patent, there is disclosed an airlift reactor providing enhanced shear in which granular sludge is used to treat wastewater. The granular sludge is carried with the upwardly flowing gas into a settling region that applies a relative overflow rate to help in the granular biomass selection process, with return of the underflow to the aerated section of the reactor.

U.S. Pat. No. 6,566,119 B1 describes an aerobic granular sludge process accomplished in a sequencing batch reactor operated with very short settling and decant periods to select for granular biomass with excellent settling properties.

U.S. Pat. No. 6,793,822 B2 describes an aerobic granular sludge process for which the granules may be created in a sequencing batch reactor by the methods of, e.g., U.S. Pat. No. 6,566,119 B1, and enhanced by the shear provided by a high superficial gas velocity of the diffused bubble aeration system.

US Patent Application Publication No. US 2006/0032815 A1 discloses an aerobic granular sludge process that appears to have been commercialized as the full-scale Nereda® process by Royal Haskoning DHV. The features of this sequencing batch reactor aerobic granular sludge process involve wasting of the fraction of slowly settling biomass from the process itself and feeding wastewater in an upflow manner through a stagnant and anaerobic layer of settled granules. This allows VFA to diffuse into the granule where PAO and GAO are established. The process is then aerated to achieve simultaneous nitrification-denitrification and denitrification by dPAO.

PCT application publication no. WO 2013/151434 A1, which appears to be assigned to Royal Haskoning DHV, discloses the transfer of waste biomass from a granular sludge process, such as that disclosed in, e.g., US 2006/0032815 A1, into a flocculent biomass process, such as the conventional activated sludge process so as to gain the benefits in terms of settleability and nitrogen and phosphorus removal in the activated sludge process.

While similar to US 2006/0032815 A1, PCT application WO2012/175489 A1 appears to improve on this process by fluidizing the bed of granules under anaerobic conditions and provides further mixing during the anaerobic period prior to aeration.

PCT application publication no. WO 2008/141413 A1 describes a sequencing batch reactor operated to promote granulation and phosphorus and nitrogen removal, with the added feature that following the anaerobic phosphorus release period, a portion of the reactor contents may be discharged from the reactor to conduct chemical precipitation of phosphate.

External Gravimetric Selection for Anammox Granule Formation and Accumulation

US Patent Application Publication No. US 2011/0198284 A1 describes the application of an external gravimetric selector for the formation and accumulation of anaerobic ammonia oxidizing bacteria (anammox) containing granules in the process. In this disclosure, it appears that the selection device could be a hydrocyclone, a centrifuge, or a high overflow rate gravity settling device. This disclosure appears to demonstrate the validity of using an external gravimetric settling device to select for anammox biomass in either a mainstream or sidestream process.

External Gravimetric Selection for Settleability Improvement

US Patent Application Publication No. US 2014/0144836 A1 describes the use of an external gravimetric selector for the selection of granular biomass in a suspended growth biological wastewater treatment process for the benefit of improved biomass settleability. In this disclosure, it appears that the selection device could be a hydrocyclone, a centrifuge, or a high overflow rate gravity settling device. This disclosure appears to demonstrate the validity of using an external gravimetric settling device to select for biomass with superior settling characteristics.

Nitrogen and Phosphorus Removal by Struvite Precipitation

Struvite is often formed during anaerobic digestion and in sludge piping, dewatering equipment, and sludge dewatering liquor piping due to high levels of phosphate and ammonia and limiting but sufficient magnesium levels. Often low pH can also limit struvite precipitation. Struvite precipitation and recovery can be used to achieve nitrogen and phosphorus removal, and this has been done using an upflow fluidized reactor with magnesium and alkalinity addition, as disclosed in, e.g., U.S. Pat. No. 7,622,047 B2. Furthermore, removal of excess magnesium and phosphorus from anaerobically digested sludge, either through the addition of alkalinity or by aeration to strip excess carbon dioxide and increase pH, and the subsequent recovery of the precipitated struvite, can decrease the risk and extent of unintentional downstream struvite scaling and the associated maintenance requirements.

The selection device or method could also be a filter or a screen that selects based on size instead of gravimetric selection

SUMMARY OF THE DISCLOSURE

According to aspects of the disclosure, it is known that granular sludge processes may be implemented in specialty purpose built reactors to achieve efficient biological phosphorus removal, and that external gravimetric selectors may be applied to suspended growth activated sludge processes to achieve biomass densification and/or granulation, so therefore the application of an external gravimetric selector can achieve or enhance biological phosphorus removal through densification or granulation in an activated sludge process. The gravimetric selector could be a hydrocyclone, a centrifuge, a gravity settling device or any gravimetric device that can select based on density. The size selector could be a screen, filter or a membrane. Furthermore the external selector may provide for the accumulation of densified biomass aggregates and granular sludge that achieves a concentration gradient of substrate and electron acceptor that allows for the accumulation of anaerobic space for organisms such as PAO and dPAO near the center of the granule, thus allowing processes such as biological phosphorus removal to be achieved efficiently without purposefully constructed tanks with anaerobic and aerobic selector zones or time sequences. The meaning of a formal anaerobic zone is that minimal amounts of dissolved oxygen and oxidized forms of nitrogen are present, but that high concentrations of VFA are present. However, formation of granules and densified biomass aggregates combines well with the application of anaerobic reactor compartments since enhanced processes requiring an anaerobic environment become less vulnerable to oxygen or nitrate introduced into this zone by the return activated sludge (RAS) or internal mixed liquor recycle (MLR) stream.

According to an aspect of the disclosure an apparatus for biological wastewater treatment is disclosed. The apparatus includes a biological selector and a physical selector. The apparatus comprises: an internal biological reactor where wastewater and recycled biomass are combined to provide a high substrate and high electron acceptor gradient for generating morphological biomass features that favor granule formation over floc and filament formation; and an external gravimetric or size selector operating on the biomass waste stream for collecting and retaining densified or larger biomass aggregates including dense or larger granule selection and for wasting smaller or lighter filaments and flocs.

The gravimetric selector may comprise a hydrocyclone, a centrifuge, an external gravity settling device, or any gravimetric approach for separating dense sludge aggregates.

The size selector may comprise a screen, filter or a membrane device for separating large sludge aggregates.

The external physical selection promotes the collection and removal of precipitated phosphorus or intracellular polyphosphate as in the case of polyphosphate accumulating organisms.

The gravimetric selector may promote an electron acceptor and substrate gradient in the densified biomass in order to create an anaerobic or anoxic core for development of niche environments for growing specific organisms.

The environments may select for organisms for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis.

A formal anaerobic selector is unnecessary to achieve phosphorus removal due to the biological selection provided by the densified aggregates, but the inclusion of a formal anaerobic selector would further improve phosphorus removal performance and reliability.

A pre-anoxic selector or zone is sufficient to achieve phosphorus removal and the densified aggregate structure of the biomass provides mass transfer resistance for nitrate penetration to the core.

According to a further aspect of the disclosure, an apparatus is disclosed for the separation of precipitated phosphorus in the form of struvite or calcium-phosphate solids from anaerobically digested or digesting solids using gravimetric selection, with or without supplemental addition of magnesium or calcium or alkalinity, the apparatus comprising a gravimetric selector. The gravimetric selector may comprise a hydrocyclone, a centrifuge, an external gravity settling device, or any gravimetric approach for separating dense sludge aggregates. The size selector may comprise a screen, filter or a membrane device, or any other size selection approach for separating large aggregates.

The external gravimetric selector may be used to preferentially recover polyhydroxyalkanoates, polyphosphate, inorganic phosphorus-containing minerals, or alginates.

The external size selector may be used to preferentially recover polyhydroxyalkanoates, polyphosphate, inorganic phosphorus-containing minerals, or alginates.

The apparatus may further comprise a settler and an aeration tank, wherein the internal biological selector is configured in a compartment located between the settler and the aeration tank and the settled sludge is recycled from the settler e.g. by means of drain-pipes at the bottom of the tank to this selector compartment where the wastewater is introduced and from this contact zone the mixed liquor is distributed to the activated sludge tank e.g. by means of distribution pipes at the bottom of the tank.

According to a further aspect of the disclosure, a method for biological wastewater treatment is disclosed which combines a biological and a physical selector, the method comprising: combining wastewater and recycled biomass in an internal biological reactor to provide a high substrate and high electron acceptor gradient for generating morphological biomass features that favor granule formation over floc and filament formation; and operating an external gravimetric or size selector on the biomass waste stream for collecting and retaining densified or large biomass aggregates including dense granule selection and for wasting lighter filaments and flocs.

The method may further comprise implementing the external physical selection to promote the collection and removal of precipitated phosphorus or intracellular polyphosphate as in the case of polyphosphate accumulating organisms.

The method may further comprise implementing the gravimetric or size selection process to promote an electron acceptor and substrate gradient in the densified or large biomass in order to create an anaerobic or anoxic core for development of niche environments for growing specific organisms.

The environments may select for organisms for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis.

According to a still further aspect, a method is disclosed for the separation of precipitated phosphorus in the form of struvite or calcium-phosphate solids from anaerobically digested or digesting solids using gravimetric selection, with or without supplemental addition of magnesium or calcium or alkalinity.

According to a still further aspect, an apparatus for biological wastewater treatment is disclosed that includes a biological selector and a physical selector, where the apparatus comprises: an internal biological reactor where wastewater and recycled biomass are combined to provide a high substrate and high electron acceptor gradient for generating morphological biomass features that favor granule formation over floc and filament formation; and an external screen selector operating on the biomass waste stream to collect and retain larger sized sludge aggregates out of the waste stream that favor non-compressible granule selection and to waste compressible filament and flocs.

The morphology promotes an electron acceptor and substrate gradient in order to create an anaerobic or anoxic core for development of niche environments for growing specific organisms.

The morphology promotes an electron acceptor and substrate gradient in order to allow for proximate substrate or metabolite transfer across niche environments.

The selection promotes for collection and removal of precipitated phosphorus.

According to a still further aspect of the disclosure, an apparatus is disclosed for the separation of precipitated phosphorus in the form of struvite or calcium-phosphate solids from anaerobically digested or digesting solids via an external screen selector, with or without supplemental addition of magnesium or calcium or alkalinity, the apparatus comprising: an external screen selector that collects and retains larger sized sludge aggregates out of a waste stream that favor non-compressible granule selection and that wastes compressible filament and flocs.

The environments select for organisms for biological phosphorus removal, denitrifying methane oxidizers, biological sulfur or sulfide oxidation, methanogenesis.

BRIEF DESCRIPTION OF THE DRAWINGS

FIGS. 9A to 9C show three perspective views of one example embodiment of a screening apparatus that may be included for size selection in lieu of the external gravimetric selector of the instant disclosure.

DETAILED DESCRIPTION OF THE DISCLOSURE

Figure 1:
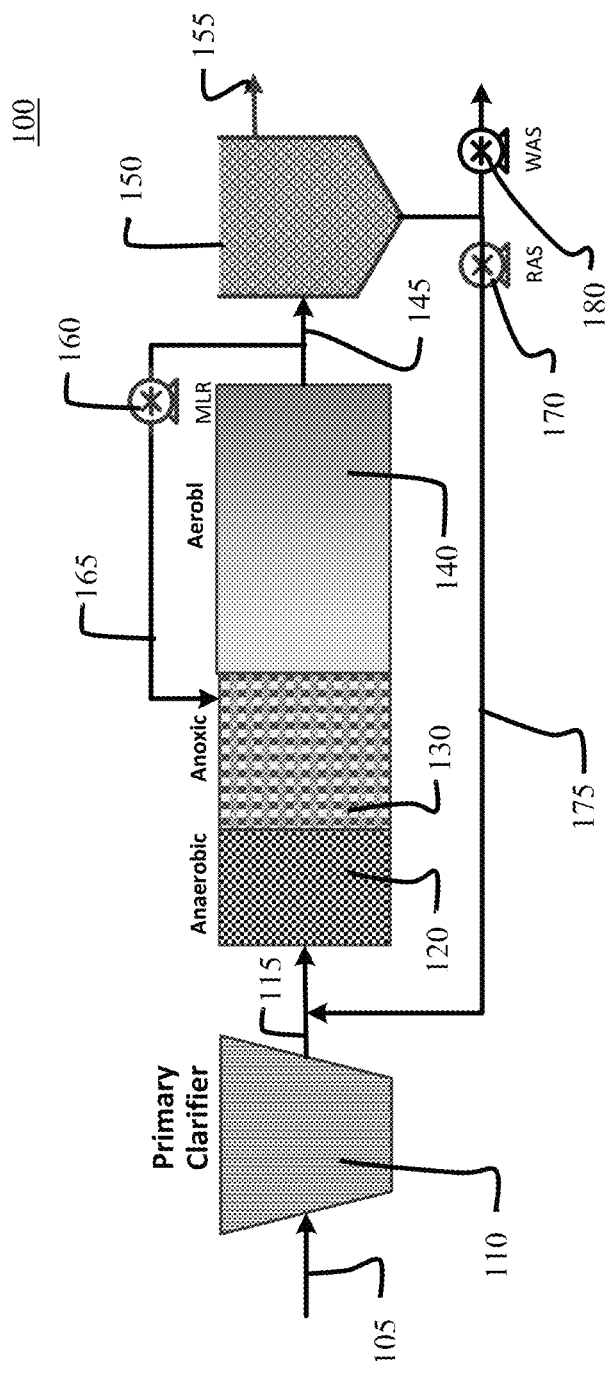
FIG. 1 shows an example of a process flow diagram for a known A2/O system.

The disclosure and the various features and advantageous details thereof are explained more fully with reference to the non-limiting embodiments and examples that are described and/or illustrated in the accompanying drawings and detailed in the following description and attachment. It should be noted that the features illustrated in the drawings and attachment are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

FIG. 1 shows an example of a known A2/O activated sludge processing system 100 (and process). The system 100 comprises a primary clarifier 110, an anaerobic zone 120, an anoxic zone 130, an aerobic zone 140, a separator or secondary clarifier 150, and a plurality of pumps 160, 170, 180.

The system 100 may include pretreatment (not shown), which may include a bar screen (not shown), a grit remover (not shown), a pre-treatment chamber (not shown), and an influent pump (not shown). The system 100 may receive wastewater 105 from an external source (not shown), such as, e.g., a sewage system, and process the wastewater 105 in the pretreatment stage to remove larger objects such as cans, rags, sticks, plastic packets, and the like, from the wastewater 105. The pretreatment stage may also include a pre-treatment chamber (not shown), which may contain, e.g., a sand or grit chamber, to adjust the velocity of the incoming wastewater 105 and thereby allow the settlement of, e.g., sand, grit, stones, broken glass, and the like. The pretreatment stage may further include a tank (not shown) for removal of, e.g., fat, grease, and the like.

Following the pretreatment stage (not shown), the remaining solid-liquid mixture 105, which includes excess wastewater containing accumulated solids, may be sent to the primary clarifier 110 for gravity settling. The primary clarifier 110 may include a tank (e.g., a clarifier tank, a sediment tank, etc.), which may have one of a variety of shapes, such as, e.g., rectangular, cone shape, circular, elliptical, and so on. The primary clarifier 110 may have a chemical or ballast material added to improve solids removal. The primary clarifier 110 settles the heavier solids from the solid-liquid mixture 105. The resulting underflow (not shown) may be output from the primary clarifier 110 and sent to solids handling for further treatment, such as, e.g., thickening, stabilization, conditioning, dewatering, sludge processing, and so on, as is known by those having ordinary skill in the art. The resulting output 115 from the primary clarifier may be fed to the anaerobic zone 120, anoxic zone 130 and aerobic zone 140 for further processing before being fed as a stream 145 to the separator 150. The output 145 from the aerobic zone may be pumped by MLR pump 160 to the anoxic zone 130 via MLR pump output 165. An underflow from the separator 150 may be fed back to an input of the anaerobic zone by RAS pump 170 via an RAS pump output line 175. The underflow may also be output from the separator 150 fed and sent out by WAS pump 180 to, e.g., solids handling for further treatment, such as, e.g., thickening, stabilization, conditioning, dewatering, sludge processing, and so on, as is known by those having ordinary skill in the art.

The system 100 is capable of carrying out biological phosphorus removal, nitrification and denitrification. BioP reliability in this system (and process) may be problematic due to the transfer of nitrate present in the return activated sludge stream 175 (RAS) to the anaerobic zone 120.

Figure 2:
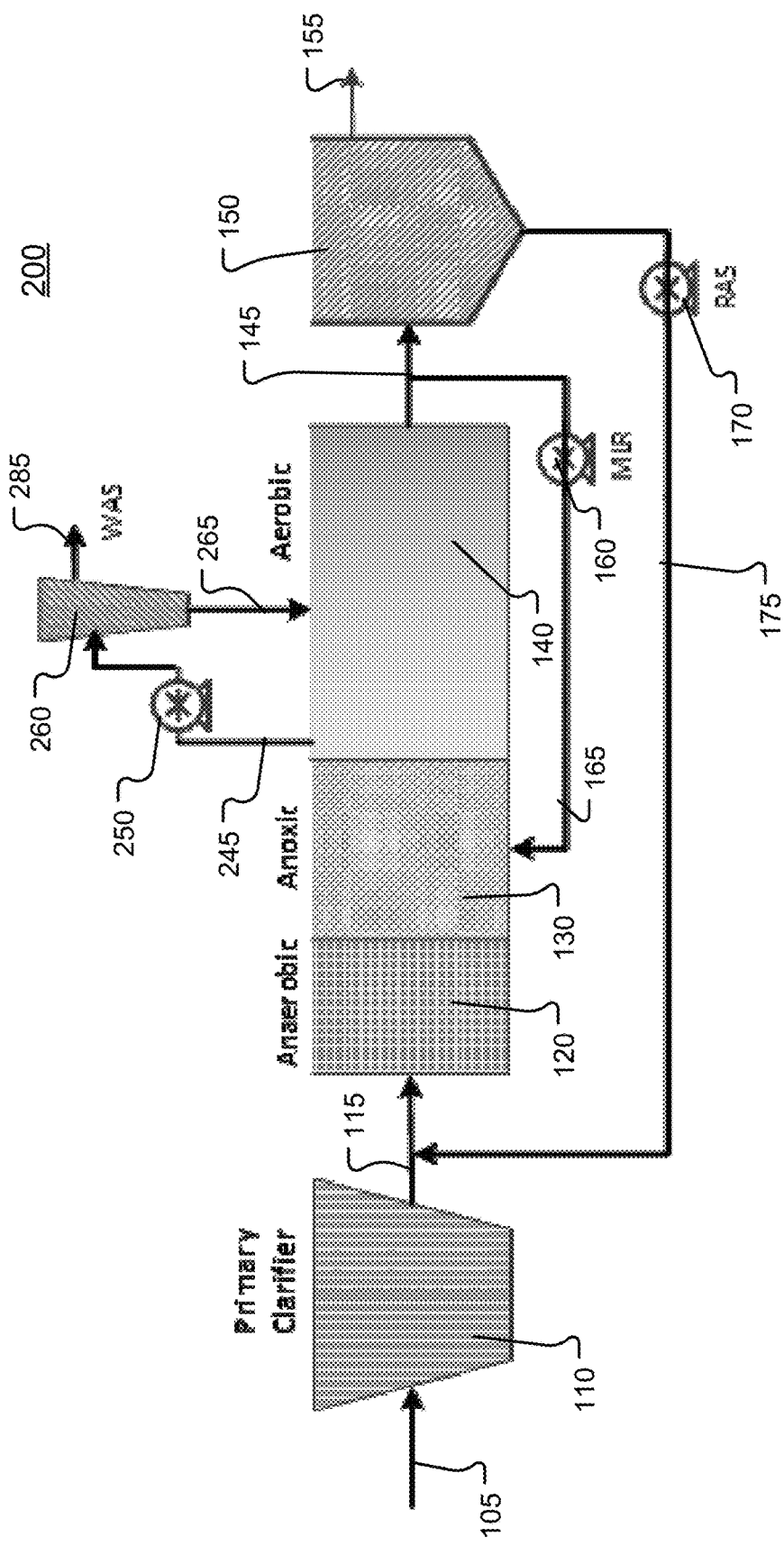
FIG. 2 shows an example of an A2/O system with an external gravimetric selector in the form of a hydrocyclone, according to an aspect of the disclosure.

FIG. 2 illustrates an example of an A2O activated sludge processing system 200 (and process), according to principles of the disclosure. Further to the system 100 shown in FIG. 1, the system 200 includes a gravimetric selector 260 that is in fluid communication with the aerobic zone 140 via a pump 250 and lines 245, 265. An output 285 of the gravimetric selector may be coupled to further processing components (not shown) for further treatment, such as, e.g., solids handling, including, e.g., thickening, stabilization, conditioning, dewatering, sludge processing, and so on.

As seen in FIG. 2, the waste stream 245 may be taken directly from the aerobic zone 140 (e.g., directly from a reactor tank (not shown)) and applied to the external gravimetric selector 260 via the pump 250 for granular densified biomass production. The gravimetric selector 260 may include, e.g., a hydrocyclone, or the like. The more dense and larger particles 265 may be returned from the gravimetric selector 285 to the aerobic zone (e.g., a reactor (not shown)) and the lighter fraction 285, representing the wasted solids, may be taken from the system 200. The inclusion and implementation of the gravimetric selector 260 enhances bioP performance and improves the reliability of the system 100 (shown in FIG. 1).

FIGS. 9A to 9C show three perspective views of one example embodiment of a screening, filtering or membrane apparatus 10 that is an external size selector and may be included in the external gravimetric selector 260 of the instant disclosure.

Referring to FIGS. 9A to 9C, the gravimetric selector 260 may include, e.g., a screening, filtering or membrane apparatus 10 that is configured to receive the waste stream 1 (or wastewater stream 245 in FIG. 2) and segregate the stream via an internal particle/solids separator 2 into waste constituents to be output to a waste stream 3 (or WAS 285 in FIG. 2) and those waste constituents to be retained 4 (or 265 in FIG. 2). The screening, filtering or membrane apparatus 10 may segregate the stream based on size and compressibility versus densification.

An optional screen wash 5 using gas, liquid or some combination of matter can be added to further assist in the screening process. This screen wash 5 can be directed toward the screen 2 in a variety of different ways, which differently affect the solids retention time, including but not limited to, along the vertical axis (FIG. 9A), angle directly perpendicular to the screen (FIG. 9B), or along the horizontal axis (FIG. 9C).

In the system 100 (shown in FIG. 1) or system 200 (shown in FIG. 2), particles may be added to provide cores to promote the formation of aggregates encapsulating the seeded particles. The particles may be added as various materials, for example, in the bioreactor to initiate or seed the formation of a granule, that could then be separated by or integrated with either an external gravimetric or external screen.

Further, organisms may be selected in the system 100 (or 200) for biological phosphorus removal, denitrifying methane oxidizers, biological sulfur or sulfide oxidation, methanogenesis.

U.S. Patent Application Publication No. US 2014/013273, which is incorporated herein by reference in its entirety, discloses an example of a method and apparatus for selecting and retaining solids in an activated sludge process for improving wastewater treatment using screens that may be used in the gravimetric selector 260 of the instant disclosure.

Figure 3:
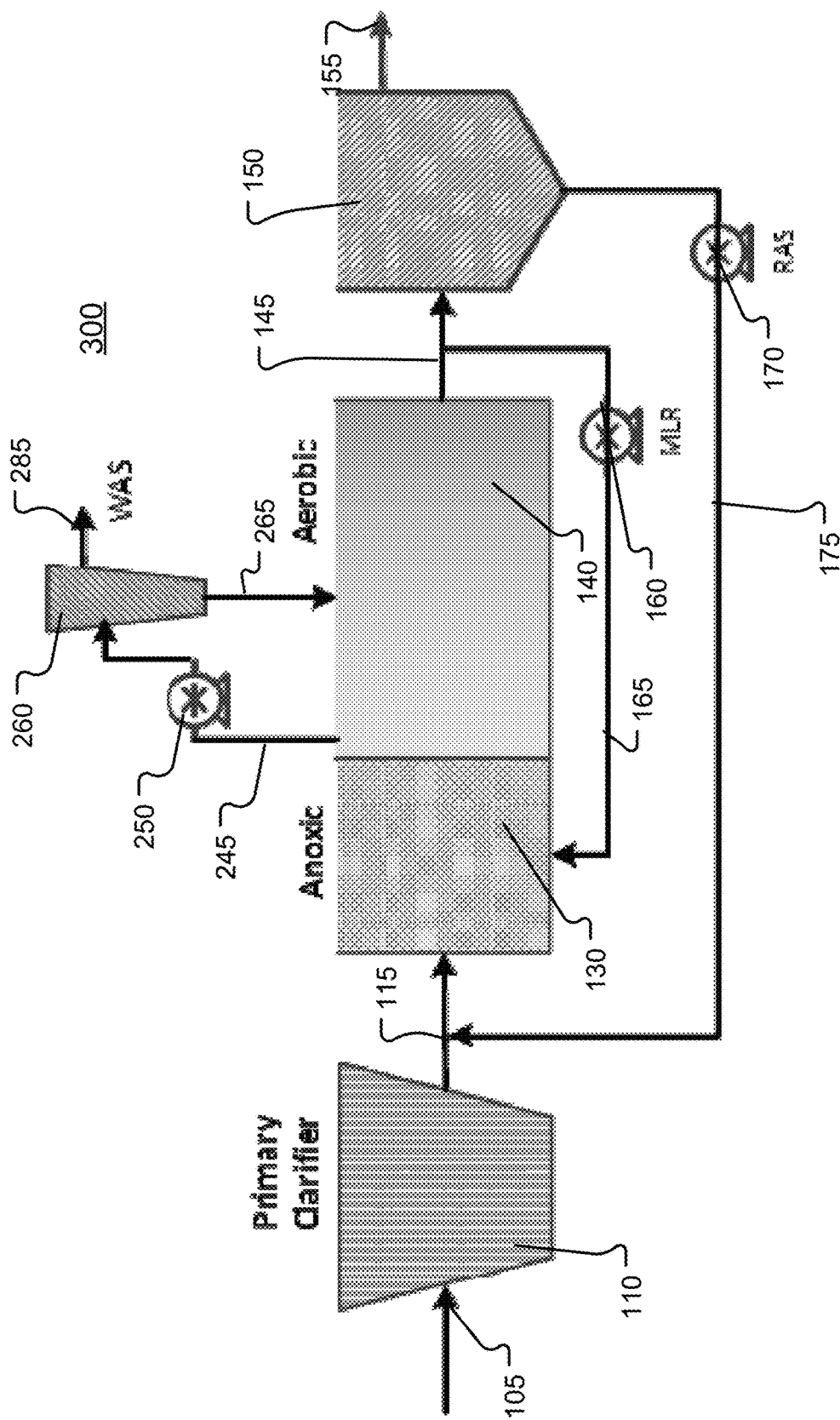
FIG. 3 shows an example of an MLE system with an external gravimetric selector in the form of a hydrocyclone, according to a further aspect of the disclosure.

FIG. 3 shows an example of an MLE activated sludge processing system 300 (and process), according to principles of the disclosure. Further to the system 200 shown in FIG. 2, the system 300 does not include an anaerobic zone 120. Accordingly, the output stream 115 from the primary clarifier 110 is fed directly to the anoxic zone 130. Without the gravimetric selector 260, the system 300 is capable of only nitrification and denitrification, and bioP activity may be limited or nonexistent. With the gravimetric selector 260 in the system 300 (e.g., in the configuration shown in FIG. 3), the system provides granular biomass production with return of more dense and larger particles 265 to the aerobic zone 140 (e.g., the reactor (not shown)) and the lighter fraction 285 representing the wasted solids taken from the system 300. The system 300 provides reliable and consistent bioP by, e.g., providing an ecological niche near the center of the granular biomass particles, where PAO and dPAO are capable of being accumulated.

Figure 4:
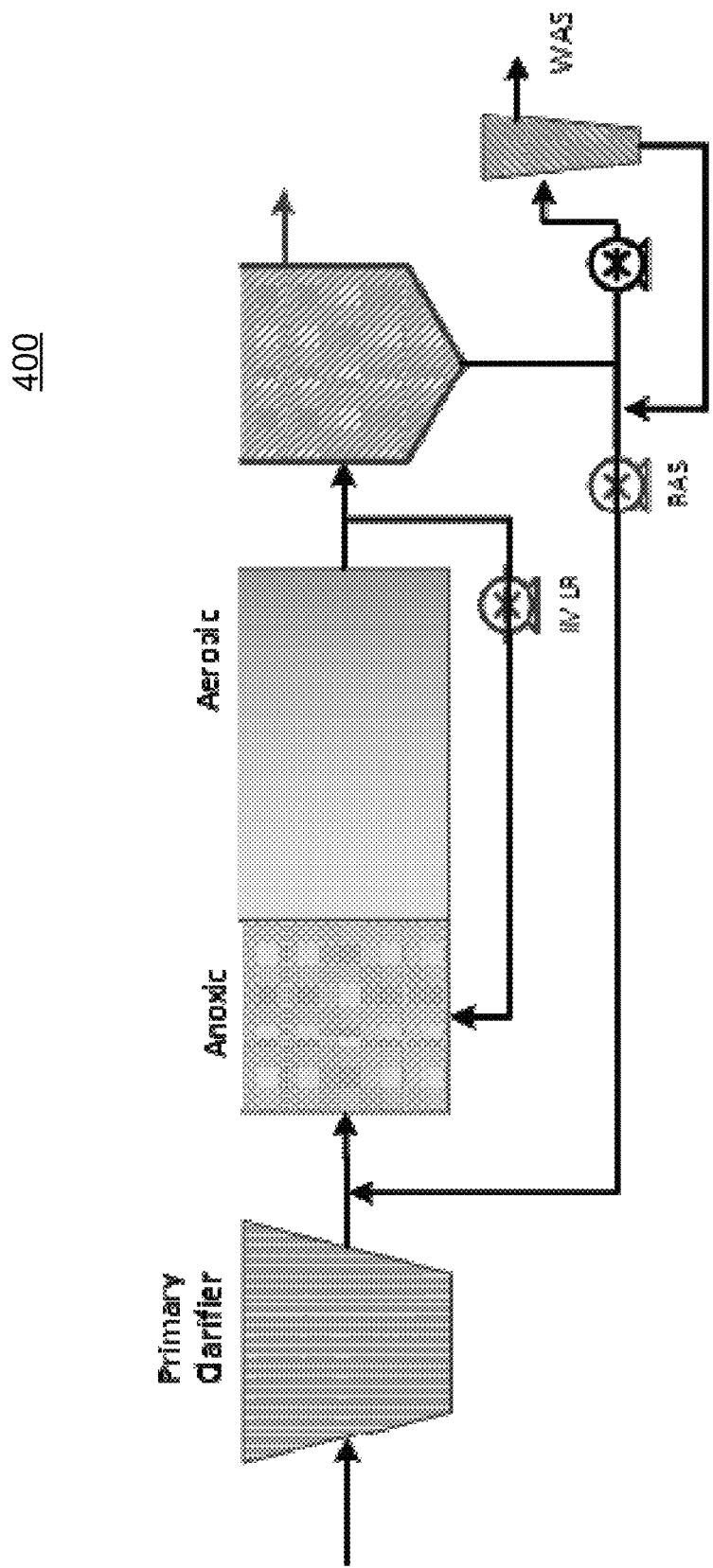
FIG. 4 shows an example of an MLE system with an alternative external gravimetric selector in the form of a hydrocyclone, according to a still further aspect of the disclosure.

FIG. 4 shows an example of a system 400 that is similar to the system 300 shown in FIG. 3, with all the same advantages, but the external gravimetric selector 260 is applied to the return activated sludge stream 175 as opposed to the aerobic zone 140 (e.g., the aeration tank biomass (not shown) in the aerobic zone 140).

Figure 5:
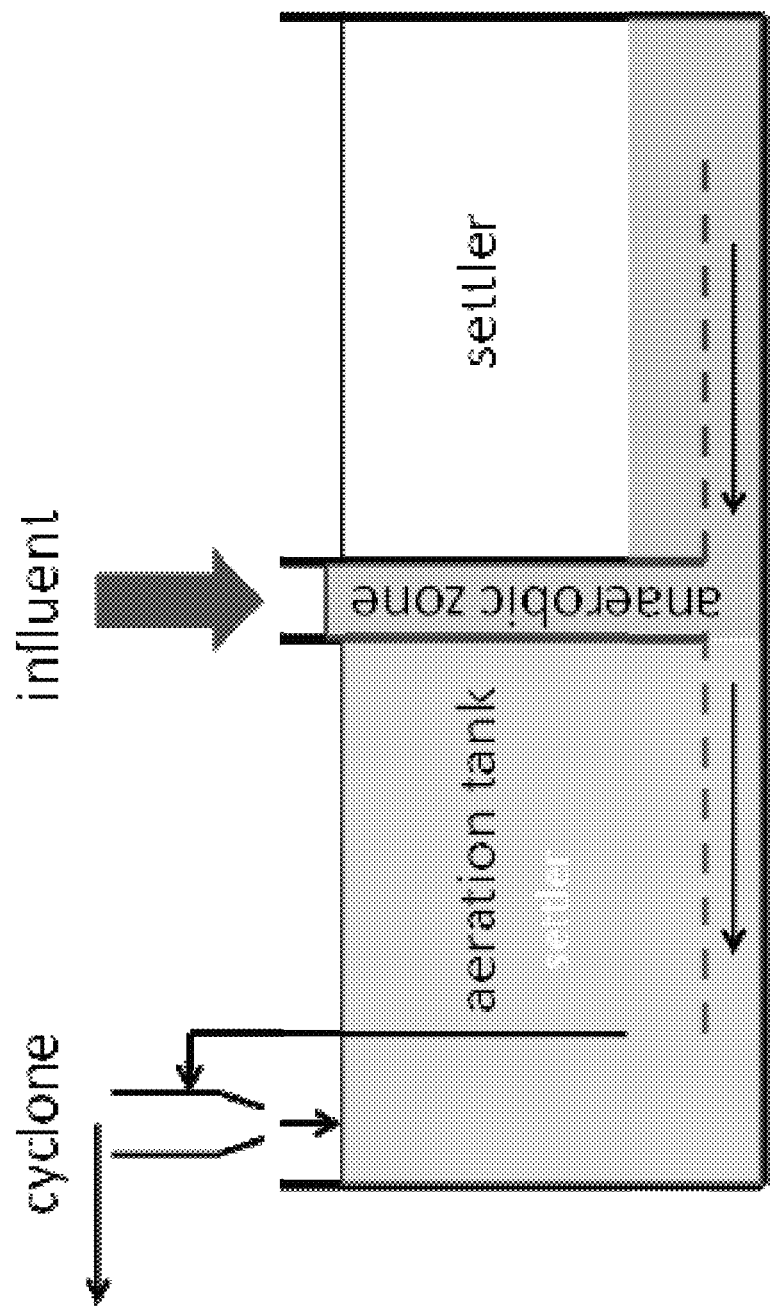
FIG. 5 shows an example of a combined integral clarifier-biological activated sludge system with anaerobic selector and an external gravimetric selector in the form of a hydrocyclone.

FIG. 5 shows an example of a combined integral clarifier-biological activated sludge process with anaerobic selector and an external gravimetric selector in the form of a hydrocyclone. The added external gravimetric selector improves bioP performance by combining biological selection through the use of a standard anaerobic selector with physical selection through the novel application of the external gravimetric selector.

Figure 6:
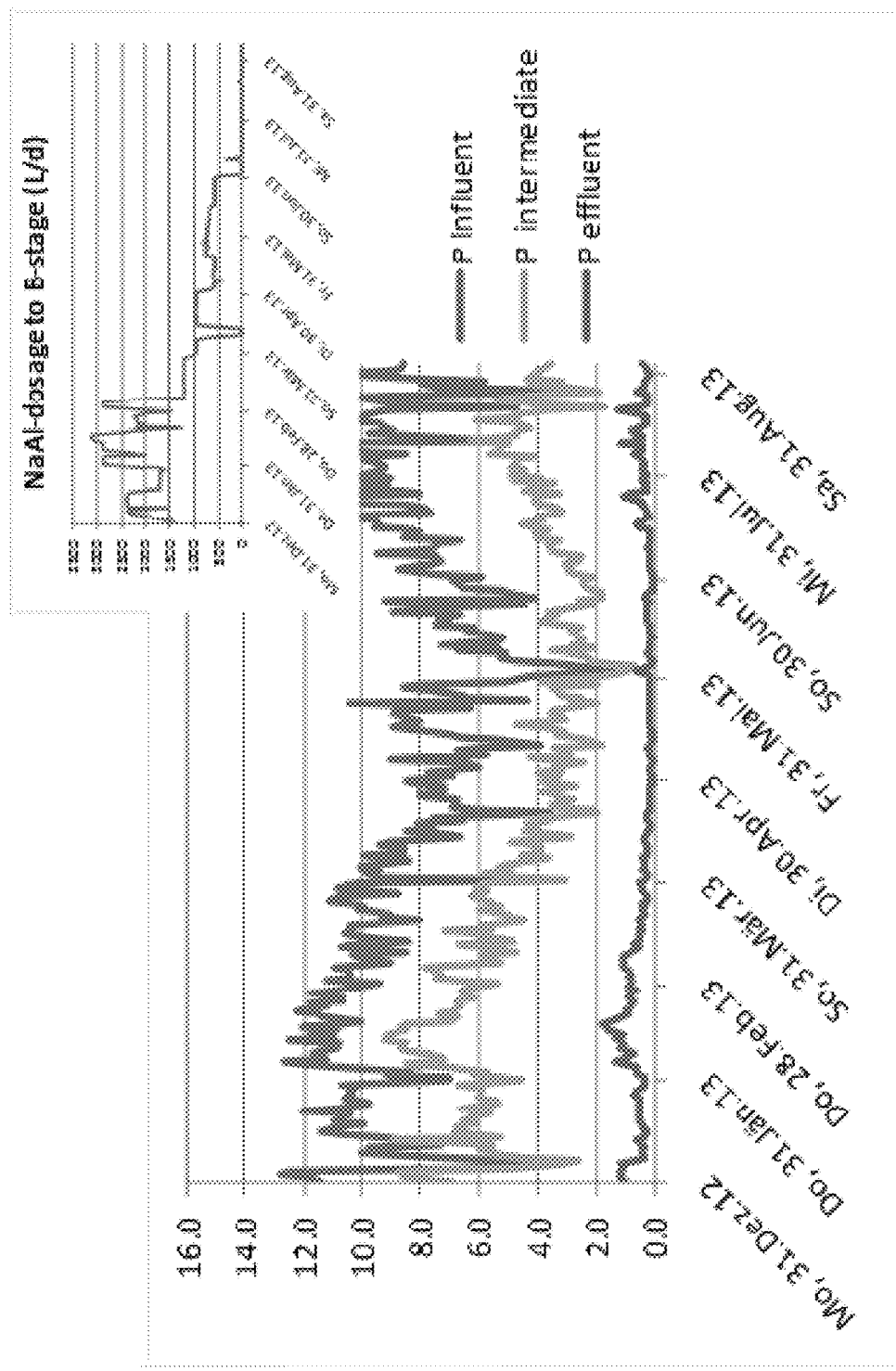
FIG. 6 shows an example of an impact of a hydrocyclone operation on bioP, and transition from predominantly chemical P precipitation to biological P removal, according to principles of the disclosure.

FIG. 6 shows an example of the impact of the external gravimetric selector in, e.g., the system 300 (or 200 or 400). In particular, FIG. 6 shows the impact of a hydrocyclone gravimetric selector on bioP at the Strass wastewater treatment plant, which uses a MLE process as shown in FIG. 3, including a hydrocyclone biomass wasting system. The data show the decreased reliance on chemical phosphorus removal with a progressive increase in biological phosphorus removal efficiency and reliability. The addition of sodium aluminate for chemical P removal was completely eliminated.

Figure 7:
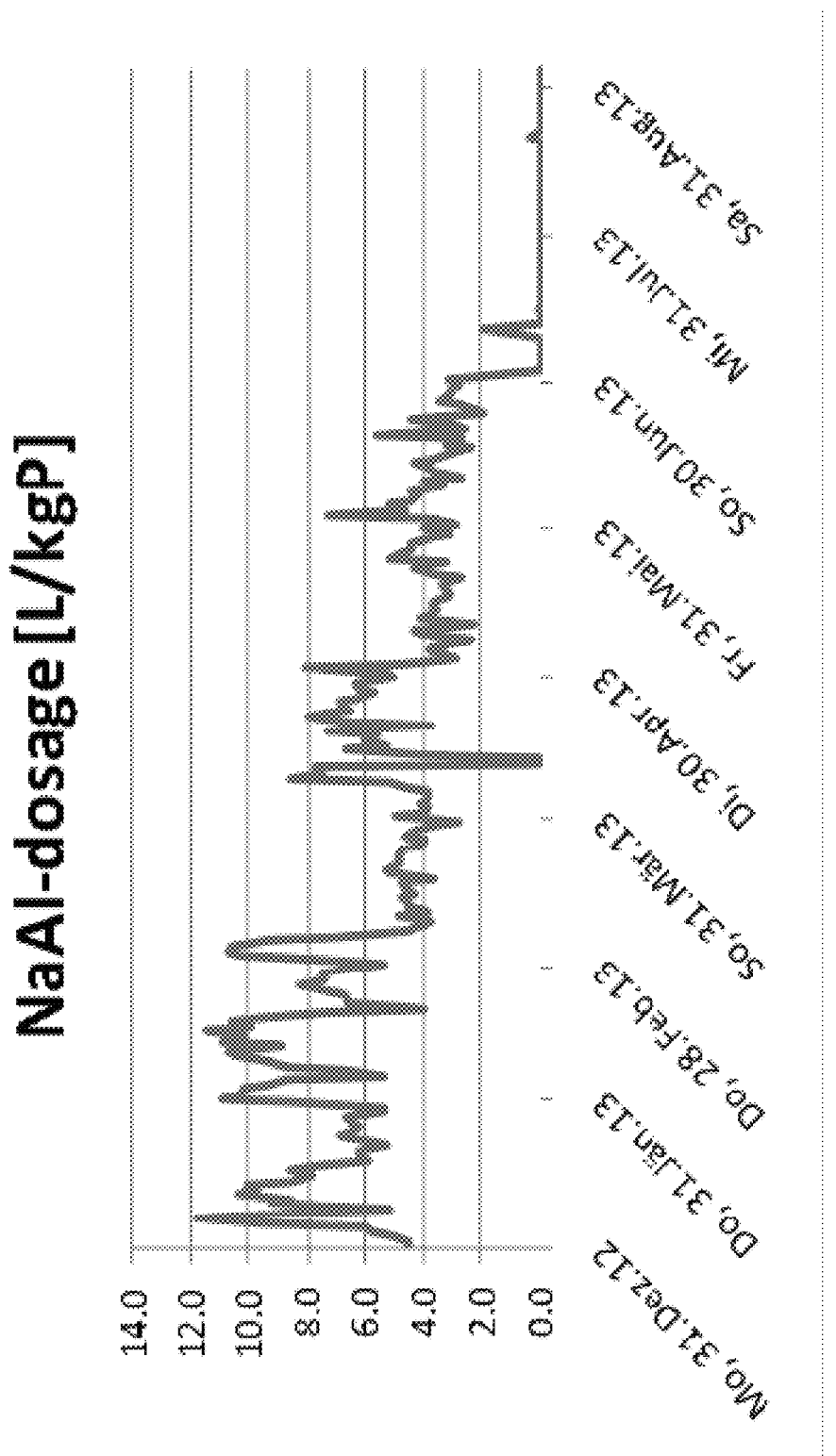
FIG. 7 shows an example of an impact of a hydrocyclone operation on bioP, and step-wise decrease of metal addition for chemical P removal down to a zero-dosing rate, according to principles of the disclosure.

FIG. 7 shows an example of the reduction in sodium aluminate dosing at the Strass wastewater treatment plant using the system 200 (or 300 or 400) for biomass wasting.

Figure 8:
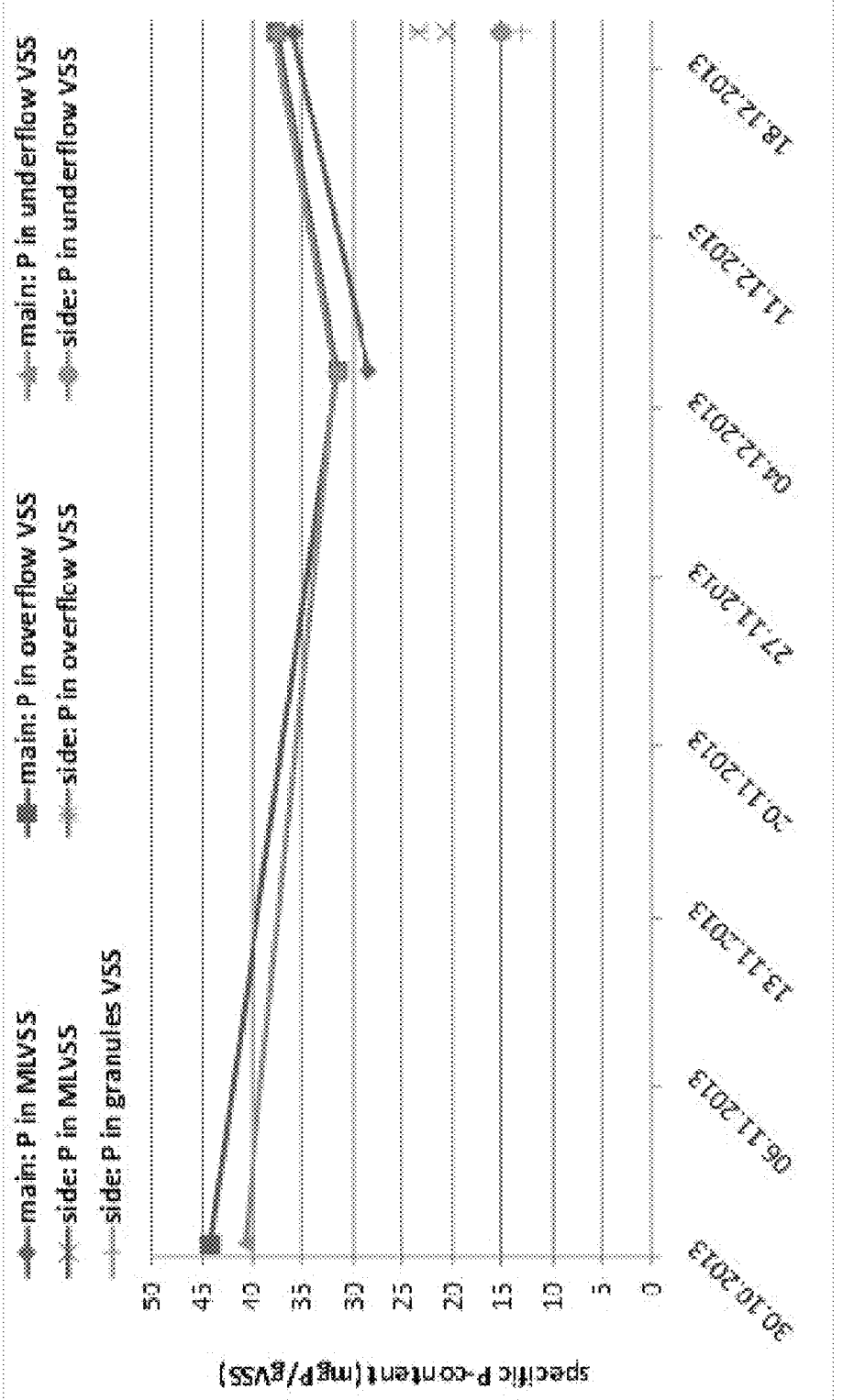
FIG. 8 shows an example of an impact of a hydrocyclone operation on bioP, where P content in activated sludge biomass is in the range of 2.8 to 4.5% in the mixed liquor volatile suspended solids (MLVSS) in the mainstream and 1.3 to 2.3% in the sidestream process, according to principles of the disclosure.

FIG. 8 shows an example of the impact of the hydrocyclone operation at the Strass wastewater treatment plant on bioP using, e.g., the system 200 (or 300 or 400). During experiments, the P content of biomass samples collected increased to values typical of conventional bioP plants. This was significant because the Strass plant does not have anaerobic selectors in place. Conventional non-bioP biomass is expected to contain approximately 1.5 to 2.0% P/MLVSS. The data in FIG. 8 show the P content in activated sludge biomass in the range of 2.8 to 4.5% P/MLVSS in the mainstream in the sidestream process.

Thus, as evident from the foregoing, for plants with no anaerobic selector, an external gravimetric selector can result in bioP. However, for plants that already have an anaerobic selector and designed for bioP (have biological selection) the addition of an external gravimetric selector can improve the reliability and efficiency of bioP The disclosure provides for a system that may combine biological (with anaerobic selector) and physical selection (with external selector).

According to principles of the disclosure, selection of more dense granules as a result of an external gravimetric selector provides a good ecological niche for dPAO and PAO, which are themselves more dense due to polyphosphate granules, so granule formation through an external gravimetric selector provides another ability to accumulate and physically select for PAO and dPAO, and PAO and dPAO have higher density due to polyphosphate granules and therefore the gravimetric selector (e.g., hydrocyclone) can select for these organisms more efficiently.

Compared to, e.g., the system 100 shown in FIG. 1, an external gravimetric selector provides better selection of dPAO over PAO because during aerated periods or in aerated zones, the inside of the granule is protected from high bulk DO, but nitrate can be present as a result of production by nitrification and diffusion to the inside of the granule. This makes nitrate is available for dPAO, providing a benefit in that VFA are being used for both N and P removal, which results in more efficient use of wastewater carbon for N and P removal than conventional processes where dPAO activity is usually a small fraction of PAO activity.

In an experiment being conducted at the WWTP Strass plant according to the principles of the instant disclosure, the main biological treatment provides high-rate carbon removal in an up-stream A-stage (not shown) at low sludge retention time (SRT) and mainly nitrogen removal in a downstream low SRT system (B-stage, not shown). The B-stage consists of 2 treatment lanes each with 2 carousel-type tanks in series which are all equipped with diffusers. Depending on the on-line measured ammonia and nitrate concentrations at the effluent of the activated sludge tanks the aeration is controlled to achieve a certain DO-set-point and nitrification efficiency. The second tank (not shown) in series is predominantly aerated in order to supply oxygen to the nitrifying biomass and the first tank (not shown) in series is mostly unaerated to provide an anoxic environment to heterotrophic biomass to denitrify recycled nitrate (MLE-mode). When the ammonia concentration increases close to limit values, the first tank may get aerated and serve as a swing-zone with additional nitrification capacity.

The initial design at the WWTP Strass plant relies on chemical P-removal by metal dosing and does not target biological phosphorus removal since no anaerobic zone is implemented and most organic acids are already removed in the A-stage and therefore are lacking for any bio-P activity. Recently for the improvement of the efficiency of the nitrogen removal process anammox granules have been augmented from the sidestream treatment system for sludge liquors (DEMON®-process) and retained in the mainstream system by the use of hydrocyclones according to the disclosure of US Patent Application No. US 2011/0198284 A1, which is incorporated herein in its entirety by reference. As described in published patent application, the cyclones may be used not only to retain anammox granules but also to create and to select for more dense activated sludge flocs in order to provide environmental niches for PAOs and DPAOs and to enhance bio-P activity. Then the metal dosing rate may be step-wise decreased (e.g., as shown in FIG. 6) while maintaining low effluent ammonia concentrations below the limit value of, e.g., 1 mg P/L. In at least one experiment, the dosing rate was set to zero and a concentration decrease resulted from about ca. 5 mgP/L down to 1 mgP/L exclusively by the biological process due to continued operation of the gravimetrical selector. Measurements indicating a 3% to 4.5% P-content in VSS of the biomass (e.g., shown in FIG. 8) clearly confirmed high phosphorus accumulating capabilities.

According to the principles of this disclosure, the bio-P activity of more dense sludge aggregates selected by the gravimetric selector (e.g., hydrocyclone) may be significantly enhanced even without any dedicated anaerobic reactor zone. Further, the combination of a gravimetrical selector with an anaerobic zone, serving as a biological selector, further enhances bio-P activity where, e.g., denser biomass aggregates may come into contact with concentrated wastewater directly from the sewer or from a pre-treatment process. Anaerobic VFA up-take and storage promotes the generation of more dense biomass which again allows the accumulation of these aggregates by the physical selection process out of the waste stream. Such an anaerobic zone could be implemented upstream at, e.g., the up-front end of the biological process where the wastewater is fed to the activated sludge system (as shown, e.g., in FIG. 2).

Alternatively the anaerobic zone could be configured in, e.g., a compartment positioned between settlers and one or more aeration tanks, as shown, e.g., in FIG. 5. The settled sludge may be recycled from the settler, e.g., by means of drain-pipes provided at the bottom of the tank. The settled sludge may be fed by, e.g., the drain-pipes, to the anaerobic compartment, where the wastewater may be introduced, and from this contact zone the mixed liquor may be distributed to the activated sludge tank, e.g., eventually by means of distribution pipes at the bottom of the tank (e.g., as shown in FIG. 5). This implementation may be compatible with, e.g., the BIOCOS process described in PCT/AT00/00322 and/or PCT/AT2011/000001, both of which are incorporated herein by reference, which already include configured alternating settling tanks with sludge-recycle-pipes at the bottom of the settlers and air-lift (mammoth pumps) providing the suction pressure to these drain pipes.

Additionally, the system may include multiple walls (e.g., dual-walls) between settlers and aeration tank in order to provide a separate compartment where the thickened sludge may come into contact with the feed and the pressure head (not shown) of, e.g., an air-lift pump (not shown) that may be used to distribute the mixed liquor to the bottom of the aeration tank. During cycle phases when the air-lift pump is not operated the continued feed-flow may be introduced to the contact-compartment and supply substrate to the high-solids liquor.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

We claim:

1. An apparatus for biological wastewater treatment that includes a biological selector and a physical selector, the apparatus comprising:
   an internal biological reactor that combines wastewater and a recycled biomass and outputs a biomass waste stream that includes a granular biomass; and
   an external selector that operates on the biomass waste stream from the internal biological reactor to collect and retain biomass aggregates that have a concentration gradient of substrate and electron acceptor that favors granule formation over floc and filament formation, and that further operates on the biomass waste stream to waste filaments and flocs in the biomass waste stream,
   wherein the collected biomass aggregates are returned to internal biological reactor for granule formation.

2. The apparatus of claim 1, wherein the external selector comprises:
   an external gravimetric selector that comprises a hydrocyclone, a centrifuge, or an external gravity settling device that operates to separate the biomass aggregates in the biomass waste stream, and that further operates to waste lighter filaments and flocs in biomass waste stream; or
   an external screen selector that operates to collect and retain biomass aggregates out of the biomass waste stream that favor non-compressible granule selection, and that further operates to waste compressible filament and flocs in the biomass waste stream.

3. The apparatus of claim 1, wherein the biomass aggregates collect and remove precipitated phosphorus or intracellular polyphosphate in the case of polyphosphate accumulating organisms.

4. The apparatus of claim 1, wherein the granular biomass includes granules having an anaerobic or anoxic core that forms a niche environment for a specific organism.

5. The apparatus of claim 4, wherein the niche environment selects the specific organism from organisms for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis.

6. The apparatus of claim 4, further comprising:
   a pre-anoxic selector that removes phosphorus, wherein the granular biomass comprises an aggregate structure that provides mass transfer resistance for nitrate penetration to the core.

7. The apparatus of claim 1, wherein the biomass aggregates carry out biological selection to achieve phosphorus removal, the apparatus further comprising an anaerobic selector that improves phosphorus removal performance and reliability.

8. The apparatus of claim 1, further comprising: a settler and an aeration tank, wherein the internal biological selector is configured in a compartment located between the settler and the aeration tank, wherein settled sludge is recycled from the settler by a drain-pipe located at a bottom of the aeration tank and supplied to the compartment where wastewater is introduced and from which a mixed liquor is distributed to an activated sludge tank by a distribution pipe.

9. An apparatus for biological wastewater treatment that includes a biological selector and a physical selector, the apparatus comprising:
   a biological reactor that combines wastewater and sludge aggregates and outputs a biomass waste stream that includes a granular biomass, the sludge aggregates having a concentration gradient of substrate and electron acceptor that generates morphological biomass features favoring granule formation over floc and filament formation; and
   an external selector that receives the biomass waste stream and separates the granular biomass in the biomass waste stream and returns the granular biomass to the biological reactor to generate said morphological biomass features that favor granule formation over floc and filament formation,
   wherein returned granular biomass separates precipitated phosphorus in the form of struvite or calcium-phosphate solids from anaerobically digested or digesting solids in a mixed liquor, with or without supplemental addition of magnesium or calcium or alkalinity.

10. The apparatus of claim 9, wherein the external selector includes:
    a gravimetric selector that comprises a hydrocyclone, a centrifuge, or an external gravity settling device for separating the sludge aggregates; or
    a screen selector for separating the sludge aggregates.

11. The apparatus of claim 1 or claim 9, wherein the external selector recovers polyhydroxyalkanoates, polyphosphate, inorganic phosphorus-containing minerals, or alginates from the biomass waste stream.

12. The apparatus of claim 9, wherein the external selector operates on the biomass waste stream to promote an electron acceptor and substrate gradient in order to create an anaerobic or anoxic core that form a niche environment for specific organisms.

13. The apparatus of claim 9, wherein the external selector operates on the biomass waste stream to promote an electron acceptor and substrate gradient to allow for proximate substrate or metabolite transfer across niche environments.

14. The apparatus of claim 9, wherein the external selector operates on the biomass waste stream to promote collection and removal of precipitated phosphorus.

15. The apparatus of claim 9, wherein the granular biomass comprises organisms selected for biological phosphorus removal, denitrifying methane oxidizers, biological sulfur or sulfide oxidation, or methanogenesis.

16. A method for biological wastewater treatment that combines a biological selector and a physical selector, the method comprising:
    combining wastewater and a recycled biomass in an internal biological reactor to provide a granular biomass;
    supplying a biomass waste stream that includes the granular biomass from the internal biological reactor to an external selector;
    operating the external selector on the biomass waste stream for collecting and retaining biomass aggregates, wherein the biomass aggregates have a concentration gradient of substrate and electron acceptor that generates morphological biomass features favoring granule formation over floc and filament formation; and
    operating the external selector for wasting filaments and flocs in the output biomass waste stream.

17. The method of claim 16, wherein the operating the external selector comprises operating:
    a gravimetric selector that comprises a hydrocyclone, a centrifuge, or an external gravity settling device to separate sludge aggregates in the biomass waste stream, and to waste lighter filaments and flocs in the biomass waste stream; or a screen selector to separate non-compressible sludge aggregates from the biomass waste stream, and to waste compressible filament and flocs in the biomass waste stream.

18. The method of claim 17, wherein operating the external screen selector comprises promoting collection and removal of precipitated phosphorus or intracellular polyphosphate when polyphosphate accumulating organisms are present.

19. The method of claim 17, wherein operating the external screen selector comprises promoting an electron acceptor and substrate gradient in the granular densified biomass, the method further comprising:

creating an anaerobic or anoxic core in the granular biomass that forms a niche environment for specific organisms.

20. The method of claim 19, further comprising:
providing mass transfer resistance for nitrate penetration to the core; and
operating a pre-anoxic selector that removes phosphorus, wherein the granular biomass comprises an aggregate structure.

21. The method of claim 17, the method further comprising:
selecting for organisms for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis.

22. The method of claim 17, further comprising operating a formal anaerobic selector to improve phosphorus removal performance and reliability in the internal biological reactor.

23. The method of claim 16, further comprising:
collecting and removing precipitated phosphorus or intracellular polyphosphate in the case of polyphosphate accumulating organisms.

24. The method of claim 16, further comprising:
supplying the biomass aggregates from the external selector to the internal biological reactor to promote an electron acceptor and substrate gradient in the granular biomass to create an anaerobic or anoxic core that forms a niche environment for a specific organism.

25. The method of claim 24, wherein the specific organism is selected for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis.

26. The method of claim 24, further comprising:
providing a pre-anoxic selector or zone that removes phosphorous and causes an aggregate structure in the granular biomass, wherein the pre-anoxic selector or zone provides mass transfer resistance for nitrate penetration to the core.

27. The method of claim 16, further comprising operating an anaerobic selector to improve phosphorus removal performance and reliability.

28. A method for biological wastewater treatment that includes a biological selector and a physical selector, with or without supplemental addition of magnesium or calcium or alkalinity, the method comprising:
combining wastewater and a recycled biomass in a biological reactor;
creating a granular biomass in the biological reactor;
supplying a biomass waste stream, including the granular biomass, from the biological reactor to an external selector;
separating the granular biomass from the biomass waste stream by operating the external selector;
returning the separated granular biomass from the external selector to the biological reactor, wherein separated granular biomass has a concentration gradient of substrate and electron acceptor that generates morphological biomass features favoring granule formation over floc and filament formation;
separating precipitated phosphorus in the form of struvite or calcium-phosphate solids from anaerobically digested or digesting solids in the biological reactor; and
wasting, by operating the external selector, filaments and flocs from the output biomass waste stream.

29. The method of claim 28, wherein the operating the external selector includes operating:
a gravimetric selector that comprises a hydrocyclone, a centrifuge, or an external gravity settling device to separate dense sludge aggregates in the biomass waste stream, and to waste lighter filaments and flocs in the waste stream; or
a screen selector to separate non-compressible sludge aggregates in the biomass waste stream, and to waste compressible filament and flocs in the biomass waste stream.

30. The method of claim 17 or claim 29, wherein the external screen selector recovers polyhydroxyalkanoates, polyphosphate, inorganic phosphorus-containing minerals, or alginates.

31. The method of claim 16 or claim 28, wherein the separating the granular biomass comprises an external gravimetric selection process that recovers polyhydroxyalkanoates, polyphosphate, inorganic phosphorus-containing minerals, or alginates.

32. An apparatus for biological wastewater treatment that includes a biological selector and a physical selector, the apparatus comprising:
an internal biological reactor that combines wastewater and recycled biomass and produces a granular biomass that has a substrate and electron acceptor gradient for generating morphological biomass features that favor granule formation over floc and filament formation; and
an external selector coupled to the internal biological reactor to receive a biomass waste stream output from the internal biological reactor,
wherein the external selector separates the granular biomass in the biomass waste stream and supplies the granular biomass to the internal biological reactor, and
wherein the internal biological reactor receives particulate material to seed the formation of granules containing biomass encapsulating the particulate material.

33. The apparatus of claim 32, wherein particulate material comprises ash, algae, plant seeds, alginate, struvite, or calcium-phosphate solids.

34. The apparatus of claim 32, wherein the granular biomass collects and removes precipitated phosphorus or intracellular polyphosphate in the case of polyphosphate accumulating organisms.

35. The apparatus of claim 32, wherein the external selector operates on the granular biomass to promote an electron acceptor and substrate gradient in the granular biomass that creates an anaerobic or anoxic core that forms a niche environment for specific organisms.

36. The apparatus of claim 35, wherein the niche environment selects for organisms for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis.

37. The apparatus of claim 35, the apparatus further comprising a pre-anoxic selector that removes phosphorus, wherein the granular biomass comprises an aggregate structure that provides mass transfer resistance for nitrate penetration to the core.

38. The apparatus of claim 32, the apparatus further comprising a formal anaerobic selector that improves phosphorus removal performance and reliability.

39. The apparatus of claim 32, wherein the external selector recovers polyhydroxyalkanoates, polyphosphate, inorganic phosphorus-containing minerals, or alginates.

40. The apparatus of claim 32, further comprising;
a settler that separates settled sludge in a mixed liquor, and
an aeration tank that provides aeration to the mixed liquor,
wherein an internal biological selector is configured in a compartment located between the settler and the aeration tank, and the settled sludge is recycled from the settler by a drain-pipe located at a bottom of the settler and supplied to an anaerobic compartment where the wastewater is introduced and from which the mixed liquor is distributed to an activated sludge tank by a distribution pipe.

41. An apparatus for biological wastewater treatment that includes a biological selector and a physical selector, the apparatus comprising:
an internal biological reactor that combines wastewater and a recycled biomass and outputs biomass aggregates;
an external gravimetric selector that collects and retains the biomass aggregates and wastes filaments and flocs; and
a settler and an aeration tank,
wherein the internal biological selector is configured in a compartment located between the settler and the aeration tank, and
wherein settled sludge is recycled from the settler by a drain-pipe located at a bottom of the setter and supplied to the compartment where wastewater is introduced and from which mixed liquor is distributed to an activated sludge tank by a distribution pipe at a bottom of the activated sludge tank.

42. A method for biological wastewater treatment that combines a biological selector and a physical selector, the method comprising:
combining wastewater and a recycled biomass in an internal biological reactor to provide biomass aggregates having a substrate and electron acceptor gradient for generating morphological biomass features that favor granular formation over floc and filament formation;
supplying the biomass aggregates in a biomass waste stream from the internal biological reactor to an external gravimetric selector;
operating the external gravimetric selector on the biomass waste stream to collect and retain the biomass aggregates in the biomass waste stream, and to waste filaments and flocs in the biomass waste stream;
returning the biomass aggregates from the external gravimetric selector to the internal biological reactor; and promoting an electron acceptor and substrate gradient in granules to create an anaerobic or anoxic core that forms a niche environment for specific organisms.

43. A method for biological wastewater treatment that combines a biological selector and a physical selector, the method comprising:
combining wastewater and a recycled biomass in an internal biological reactor to provide biomass aggregates;
supplying a biomass waste stream, including the biomass aggregates, from the internal biological reactor to an external gravimetric selector;
operating the external gravimetric selector to collect and retain the biomass aggregates, and to waste filaments and flocs in the biomass waste stream;
returning the biomass aggregates from the external gravimetric selector to the internal biological reactor; and
providing mass transfer resistance for nitrate penetration to a granule core by means of a pre-anoxic selector or zone that achieves phosphorus removal and an aggregate structure of the biomass aggregates.

44. A method for biological wastewater treatment that combines a biological selector and a physical selector, the method comprising:
combining wastewater and a recycled biomass in an internal biological reactor to provide a granular biomass;
creating an anaerobic or anoxic core in the granular biomass that forms a niche environment for a specific organism;
supplying a biomass waste stream, including the granular biomass, from the internal biological reactor to an external screen selector; and
operating the external screen selector on the biomass waste stream for collecting and retaining sludge aggregates in the biomass waste stream that favor non-compressible granule selection, and for wasting compressible filament and flocs in the biomass waste stream,
wherein the operating the external screen selector comprises promoting an electron acceptor and substrate gradient in the granular biomass.

45. A method for biological wastewater treatment that combines a biological selector and a physical selector, the method comprising:
combining wastewater and a recycled biomass in an internal biological reactor to provide a granular biomass;
selecting for organisms for biological phosphorus removal, including aerobic and denitrifying polyphosphate accumulating organisms, glycogen accumulation, denitrifying anoxic methane oxidizers, denitrifying biological sulfur or sulfide oxidation, and methanogenesis;
supplying a biomass waste stream, including the granular biomass, from the internal biological reactor to an external screen selector; and
operating the external screen selector on the biomass waste stream for collecting and retaining sludge aggregates in the biomass waste stream that favor non-compressible granule selection, and for wasting compressible filament and flocs in the biomass waste stream.

46. A method for biological wastewater treatment that combines a biological selector and a physical selector, the method comprising:

combining wastewater and a recycled biomass in an internal biological reactor to provide a granular biomass;

operating an anaerobic selector to improve phosphorus removal performance and reliability in the internal biological reactor;

supplying a biomass waste stream, including the granular biomass, from the internal biological reactor to an external screen selector; and operating the external screen selector on the biomass waste stream for collecting and retaining sludge aggregates out of the biomass waste stream that favor non-compressible granule selection, and for wasting compressible filament and flocs in the biomass waste stream.

47. A method for biological wastewater treatment that combines a biological selector and a physical selector, the method comprising:

combining wastewater and a recycled biomass in an internal biological reactor to provide a granular biomass;

providing mass transfer resistance for nitrate penetration to a core of the granular biomass;

operating a pre-anoxic selector that removes phosphorus;

supplying a biomass waste stream, including the granular biomass, from the internal biological reactor to an external screen selector; and operating the external screen selector on the biomass waste stream for collecting and retaining sludge aggregates in the biomass waste stream that favor non-compressible granule selection, and for wasting compressible filament and flocs in the biomass waste stream, wherein the granular biomass comprises an aggregate structure.

* * * * *